United States Patent [19]

Lucas et al.

[11] 4,214,945
[45] Jul. 29, 1980

[54] METHOD OF MAKING A PERFORATED TUBULAR MEMBER

[75] Inventors: Malcolm B. Lucas; H. Robert Van Coney, both of Cincinnati, Ohio

[73] Assignee: The Procter & Gamble Company, Cincinnati, Ohio

[21] Appl. No.: 10,575

[22] Filed: Feb. 9, 1979

Related U.S. Application Data

[62] Division of Ser. No. 733,961, Oct. 19, 1976, Pat. No. 4,151,240.

[51] Int. Cl.$^2$ .............................................. B32B 31/00
[52] U.S. Cl. ................................. 156/634; 29/33 D; 29/163.5 R; 29/423; 156/153; 156/245; 156/645; 156/656; 204/9; 204/11; 427/178; 427/289; 427/292
[58] Field of Search ............... 427/135, 367, 178, 289, 427/292; 264/504, 154, 522, 155, 156, 89, 92, 90; 156/634, 656, 645, 153, 245, 304; 204/9, 11; 29/33 D, 163.5, 423

[56] References Cited

U.S. PATENT DOCUMENTS

| 2,660,757 | 12/1953 | Smith et al. ............................. 264/92 |
| 2,776,451 | 1/1957 | Chavannes ............................. 264/92 |
| 3,012,918 | 12/1961 | Schaav ................................. 264/154 |
| 3,054,148 | 9/1962 | Zimmerli .............................. 264/90 |
| 3,560,601 | 2/1971 | Johnson ............................... 264/154 |
| 3,929,135 | 12/1975 | Thompson ............................ 128/287 |
| 3,979,494 | 9/1976 | Ericson ................................ 264/154 |

FOREIGN PATENT DOCUMENTS

| 2409496 | 11/1975 | Fed. Rep. of Germany ............ 264/154 |
| 2206164 | 12/1974 | France .................................. 264/92 |

Primary Examiner—Bernard D. Pianalto
Attorney, Agent, or Firm—J. R. Melnikoff; F. H. Braun; R. C. Witte

[57] ABSTRACT

A method of and apparatus for uniformly debossing and perforating a ribbon of thermoplastic sheet material or film through the use of vacuum in combination with a flash heating source such as a flow of hot air. The apparatus causes a ribbon of such film to be forwarded from a supply such as a roll of thermoplastic material, then about a circumferentially extending portion of a rotating debossing-perforating cylinder, and then downstream where the debossed and perforated film may be further processed or where it may be wound on a spool to form a roll thereof. The debossing-perforating cylinder comprises a perforated tubular member through which a plurality of independently adjustable levels of vacuum can be applied from within the cylinder to circumferentially spaced sections of the film in contact with the exterior surface of the perforated tubular member. The apparatus further causes a virtual curtain of hot air to be directed radially inwardly towards a predetermined zone of the perforated tubular member. Then vacuum applied from within the cylinder acts in concert with the curtain of hot air which flash heats the film sufficiently to effect debossing and perforating the film running circumferentially about the rotating cylinder. The apparatus may further control tension in the film both upstream and downstream of the debossing cylinder at predetermined constant levels. A method of making the perforated tubular member is also disclosed which entails forming the member inside-out, and then turning it right-side-out by slitting it longitudinally, reverse rolling it into the desired tubular shape, and then seaming it along the slitting formed edges. The tubular member can then be coated with a release enhancing material such as Teflon (registered trademark, E. I. DuPont Co.) on its radially outwardly facing surface to facilitate releasing the thermoplastic film after the film has been debossed and perforated thereon.

6 Claims, 23 Drawing Figures

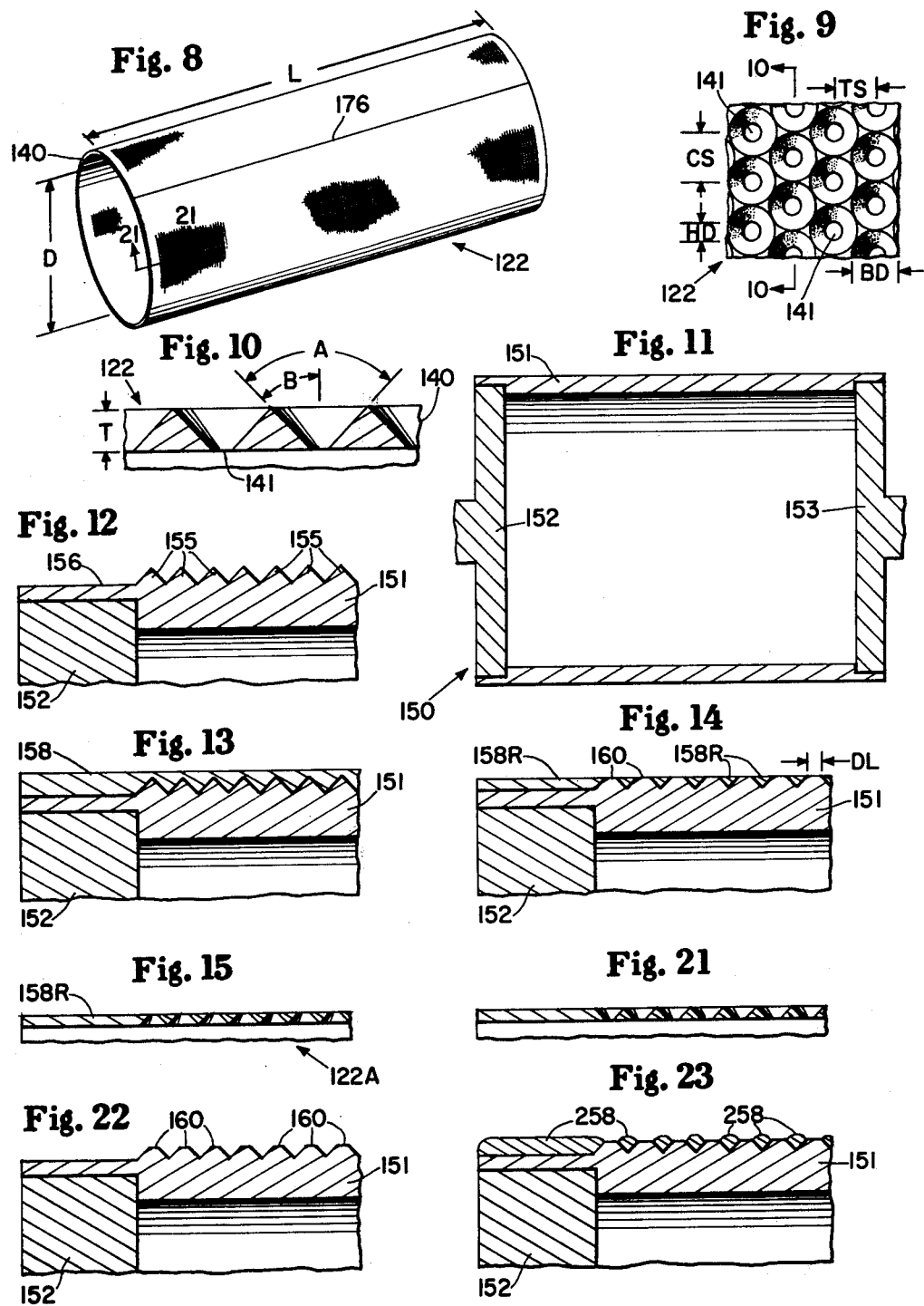

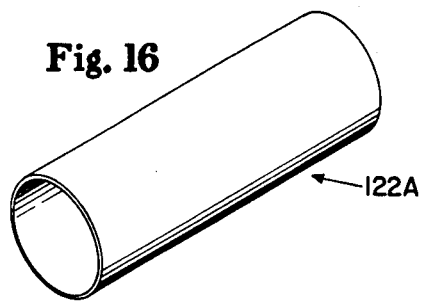
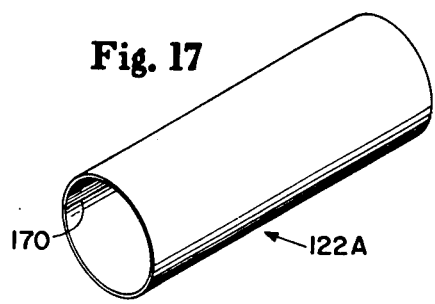
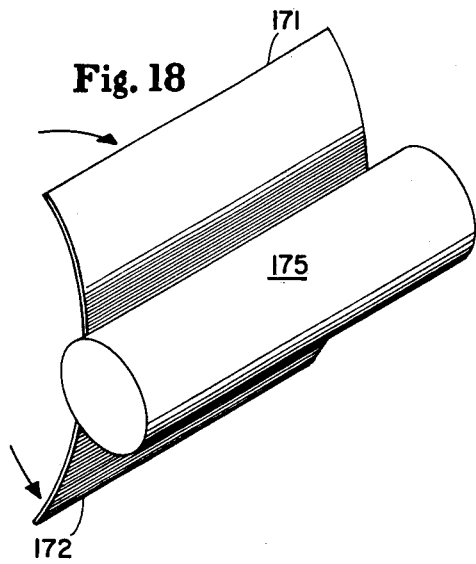
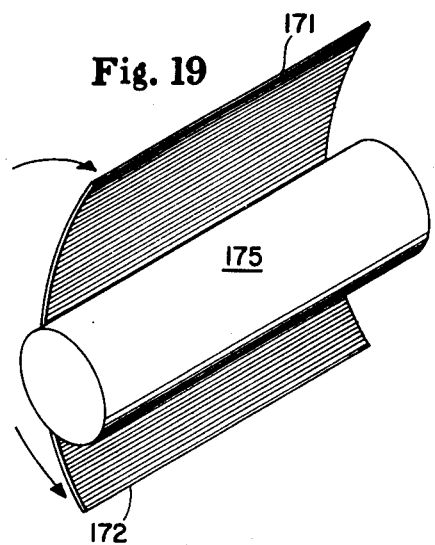
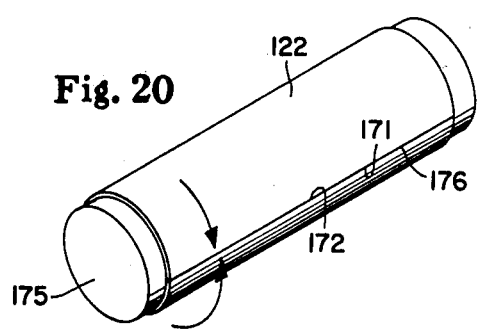

METHOD OF MAKING A PERFORATED TUBULAR MEMBER

This is a division, of application Ser. No. 733,961, filed Oct. 19, 1976 and now U.S. Pat. No. 4,151,240.

BACKGROUND OF THE INVENTION

Apparatuses comprising various means for unwinding, forwarding, debossing or embossing, and/or perforating, and rewinding of a ribbon or web of thermoplastic film are disclosed in the prior art: see for instance, U.S. Pat. Re. No. 23,910—Method Of And Apparatus For Producing Textured Films which issued Dec. 14, 1954 to L. H. Smith et al.; U.S. Pat. No. 3,054,148—Process Of Producing A Perforated Thermoplastic Sheet which issued Sept. 18, 1962 to W. F. Zimmerli; and U.S. Pat. No. 2,567,275—Apparatus And Method Of Goffering Thermoplastic Materials which issued Sept. 11, 1951 to R. Colombo. See also the German Offenlegungsschrift 2,409,496 which teaches the use of radially inwardly impinging hot air jets in combination with vacuum inside a cylinder having a perforated surface to cause a thermoplastic sheet passing therebetween to become perforated. Also, reference U.S. Pat. No. 3,674,221—Dynamic Stress-Strain Testing Of Ribbons Of Film which issued July 4, 1972 to Coenraad E. Riemersma.

The prior art also discloses various methods of making perforated members: see for instance U.S. Pat. No. 3,453,712—Method of Making A Porous Roll which issued July 8, 1969 to R. G. MacKendrick; U.S. Pat. No. 3,613,208—Method of Fabricating A Perforated Panel For A Vacuum Work-Holder Or Chuck which issued Oct. 19, 1971 to H. A. Seberg et al.; and U.S. Pat. No. 3,247,579—Circuit Fabrication Method which issued April 26, 1966 to L. H. Cattermole et al.

The prior art does not disclose, however, solutions to all of the problems associated with providing a method of and apparatus for uniformly embossing and perforating a web of thermoplastic material, or a method of making a suitable perforated tubular member for use in such an apparatus in the manner of or degree of the present invention.

OBJECTS OF THE INVENTION

The nature and substance of the invention will be more readily appreciated after giving consideration to its major aims and purposes. The principal objects of the invention are recited in the ensuing paragraphs in order to provide a better appreciation of its important aspects prior to describing the details of a preferred embodiment in later portions of this description.

A major object of the present invention is to provide an apparatus for substantially uniformly debossing and perforating thermoplastic sheet material.

Another object of the present invention is to provide the apparatus described in the preceding paragraph wherein a continuous ribbon of thermoplastic material having a nominal thickness (e.g., from about one-half (½) mil to about three (3) mils) is debossed and perforated to provide open bottom, truncated conical debossments or tapered capillaries.

Yet another object of the present invention is to provide the apparatus described in the preceding paragraph wherein the ribbon of thermoplastic film is uniformly tensioned and smoothed prior to being debossed and perforated.

Still yet another object of the present invention is to provide the apparatus described in the preceding paragraph wherein the debossed and perforated film is wound under uniform tension to form a roll of debossed and perforated film, and wherein the debossed and perforated film is cooled to a temperature substantially less than the thermoplastic temperature of the thermoplastic material prior to being wound into a roll.

A further object of the present invention is to provide a method of making a uniformly perforated tubular member for a debossing-perforating cylinder for use in such apparatuses as those described in the preceding paragraphs.

SUMMARY OF THE INVENTION

The above recited and other objects of the invention are achieved by providing a method of and apparatus for continuously debossing and perforating a running ribbon of thermoplastic film.

The method of the present invention to continuously deboss and perforate a running ribbon of smooth thermoplastic film comprises the steps of: establishing and maintaining control of the running film by establishing and maintaining constant tension therein; isolating a portion of the film from the constant tension while it is in contacting relation with a perforated pattern surface; heating the tension isolated portion of the film to raise its temperature to above its thermoplastic temperature; applying a sufficiently great pneumatic differential pressure to the heated, tension isolated portion of the film to cause the film to be debossed and perforated in the image of the perforated pattern surface; and, cooling the debossed and perforated film to lower its temperature to below the thermoplastic temperature of the film before subjecting the film to downstream tension.

The apparatus embodiment of the present invention comprises a debossing-perforating cylinder having a perforated tubular-shape wall having a radially outwardly facing surface, and the present invention includes a method of making such a thin wall, tubular-shape perforated tubular member of metal which wall is perforated by an array of radially inwardly tapered apertures. The apparatus further comprises a frame, means for rotating the cylinder at a controlled rate on its axis of gyration, means for smoothing and forwarding the running ribbon of film under predetermined tension onto the radially outwardly facing surface of the tubular wall at a first fixed position with respect to the frame, means for leading debossed and perforated film from the cylinder at a second fixed position with respect to the frame which is circumferentially spaced from the first fixed position, means intermediate the first and second fixed positions for applying a sufficiently high level of vacuum to the film and for heating the film to a sufficiently high temperature to deboss and perforate the film, means for cooling the film to a temperature below its thermoplastic temperature while maintaining virtually zero tension wherein, and means for thence forwarding the film from the perforating cylinder under a predetermined level of tension. The method of making a relatively thin wall perforated tubular member having a wall which is perforated by an array of radially inwardly tapered apertures comprises the steps of forming a pattern cylinder having a radially outwardly facing pattern surface comprising a multiplicity of radially outwardly extending protruberances. The protruberances are tapered to radially outwardly disposed free ends and have a radially extending height at least as great as the thickness of the desired perforated wall. The protruberances are so spaced and shaped that they comprise an inside-out negative pattern for the desired array of apertures in the desired perforated wall, and so that the composite of the spaces intermediate the protruberances comprises an inside-out negative pattern for the perforated tubular member. The pattern surface is then covered with sufficient metal to fill the spaces intermediate the protruberances to a depth at least as great as the desired thickness of the wall of the perforated tubular member. The metal covering is then converted into an inside-out tubular member by machining the radially outwardly facing area of the metal covering sufficiently to provide a uniform thickness thereof which is substantially equal to the desired thickness of the desired perforated wall, and by then disassociating the metal covering from the pattern cylinder. The inside-out perforated tubular member is then converted into the desired perforated tubular member by longitudinally slitting it, reverse rolling it into the desired tubular shape, and longitudinally seaming the slitting-formed-edges together in abutting relation. The apparatus may further comprise constant tension unwind means, constant tension winding means, and means for independently maintaining different levels of vacuum subjacent a plurality of circumferentially disposed sectors of the perforated tubular member as the perforating cylinder rotates. Moreover, the perforated tubular member may be teflon coated to provide better film release characteristics.

BRIEF DESCRIPTION OF THE DRAWINGS

While the specification concludes with claims particularly pointing out and distinctly claiming the subject matter regarded as the present invention, it is believed the invention will be better understood from the following description taken in connection with the accompanying drawings in which:

FIG. 8 is a perspective view of the perforated tubular member of the debossing-perforating cylinder shown in FIGS. 5 through 7 inclusive.

FIG. 9 is an enlarged scale, fragmentary view of the radially outwardly facing surface of the perforated tubular member shown in FIG. 8.

FIG. 10 is an enlarged scale, fragmentary sectional view taken along line 10—10 of FIG. 9.

FIG. 11 is a longitudinal sectional view of a pattern cylinder used for making the perforated tubular member shown in FIG. 8.

FIG. 12 is an enlarged scale, fragmentary view of the pattern cylinder shown in FIG. 11 after a multiplicity of radially outwardly extending conical protruberances have been formed on its radially outwardly facing surface.

FIG. 13 is a view of the fragment of the pattern cylinder shown in FIG. 12 after its radially outwardly facing surface has been electroplated to a sufficient thickness to cover the protruberances thereon and to fill the spaces intermediate the protruberances.

FIG. 14 is a view of the fragmentary portion of the plated pattern cylinder shown in FIG. 13 after sufficient plating has been removed to truncate the conical protruberances and to provide a cylindrical surface which is concentric with the axis of gyration of the pattern cylinder.

FIG. 15 is a fragmentary view of an inside-out perforated tubular member which is in fact the plating portion of the plated pattern cylinder shown in FIG. 14 after the pattern cylinder per se has been disassociated therefrom as by chemical etching.

FIG. 16 is a perspective view of the inside-out perforated tubular member resulting from the sequence of operations shown in FIGS. 11 through 15 inclusive.

FIGS. 17 through 20 are perspective views which sequentially show longitudinally slitting, reverse rolling, and reseaming the inside-out tubular member shown in FIG. 16 to convert it into the perforated tubular member shown in FIG. 8.

FIG. 21 is a fragmentary sectional view taken along line 21—21 of FIG. 8.

FIG. 22 is a view of the fragmentary portion of the pattern cylinder shown in FIG. 12 after its conical protruberances have been uniformly truncated.

FIG. 23 is a view of the fragmentary portion of the pattern cylinder shown in FIG. 22 after the spaces intermediate the truncated conical protruberances have been filled with a metal as by electroplating.

DESCRIPTION OF THE PREFERRED EMBODIMENT

Figure 1:
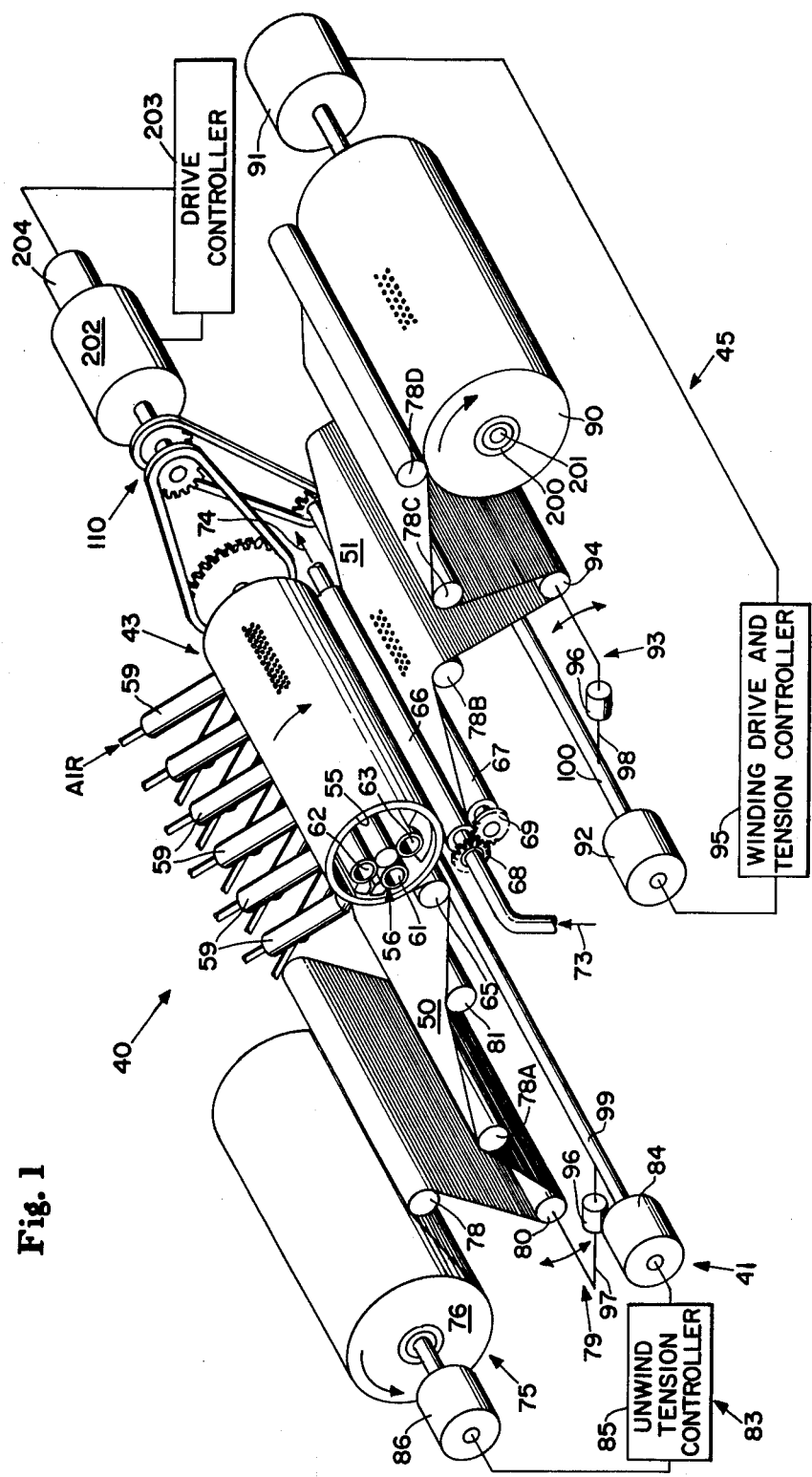
FIG. 1 is a perspective schematic view of an apparatus embodying the present invention.

A preferred embodiment of the present invention, apparatus 40, is shown in FIG. 1 to include constant tension film supply means 41, debossing and perforating means 43, and constant tension film forwarding and winding means 45. The frame, bearings, supports and the like which must necessarily be provided with respect to the functional members of apparatus 40 are now shown in the figures or described in detail in order to simplify and more clearly depict and disclose the present invention, it being understood that such details would be obvious to persons of ordinary skill in the art of designing thermoplastic film converting machinery.

Briefly, apparatus 40, FIG. 1, comprises means for continuously converting a ribbon of thermoplastic film 50 into a debossed and perforated film 51 by directing hot air jets against one surface of the film while applying vacuum adjacent the opposite surface of the film, and while maintaining sufficient control of the film 50 to substantially obviate wrinkling and/or macroscopically distending the film. Thus, as will be more fully described hereinafter, apparatus 40 comprises means for maintaining constant machine direction tension in the film both upstream and downstream of a zone where the temperature of the film is greater than the thermoplastic temperature of the film but in which zone there is substantially zero machine-direction and transverse-machine-direction tension tending to macroscopically distend the film. The tension is required to control and smooth a running ribbon of thermoplastic film; the zero tension zone results from the film in the zone being at a sufficiently high temperature to enable debossing and perforating it through the use of heat and vaccum. FIG. 1 also shows greatly enlarged scale perforations in film 51 to enable visually perceiving the nature of the difference between the imperforate film 50 and the debossed and perforated film 51 as more fully described hereinafter.

Figure 2:
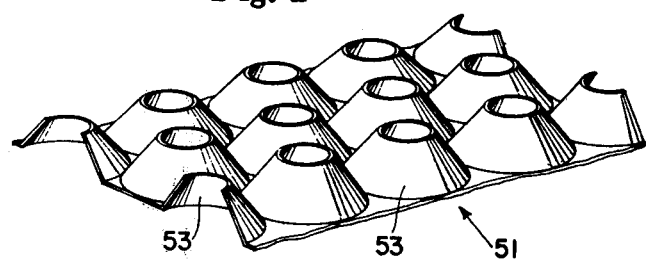
FIGS. 2 and 3 are perspective fragmentary views of the bottom side (machine side) and the top side respectively of a debossed and perforated thermoplastic film.
Figure 3:
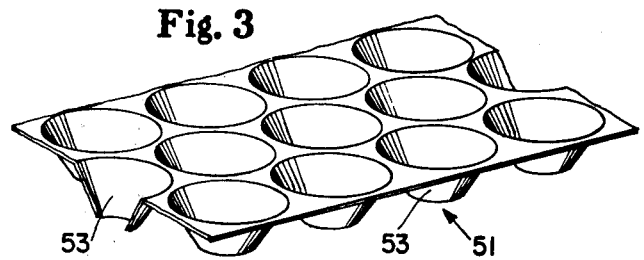

FIGS. 2 and 3 are perspective views of fragmentary portions of debossed and perforated film 51 of a thermoplastic material such as polyethylene which has been converted from a plain film through the use of apparatus 40, FIG. 1. Such a debossed and perforated film may be used, for example, as a topsheet in an absorptive structure having tapered capillaries 53. Such structures, including disposable diapers, incontinent pads, bandages, and the like, are disclosed in U.S. Pat. No. 3,929,135 which was issued Dec. 30, 1975 to Hugh Ansley Thompson, and which is hereby incorporated by reference.

Figure 4:
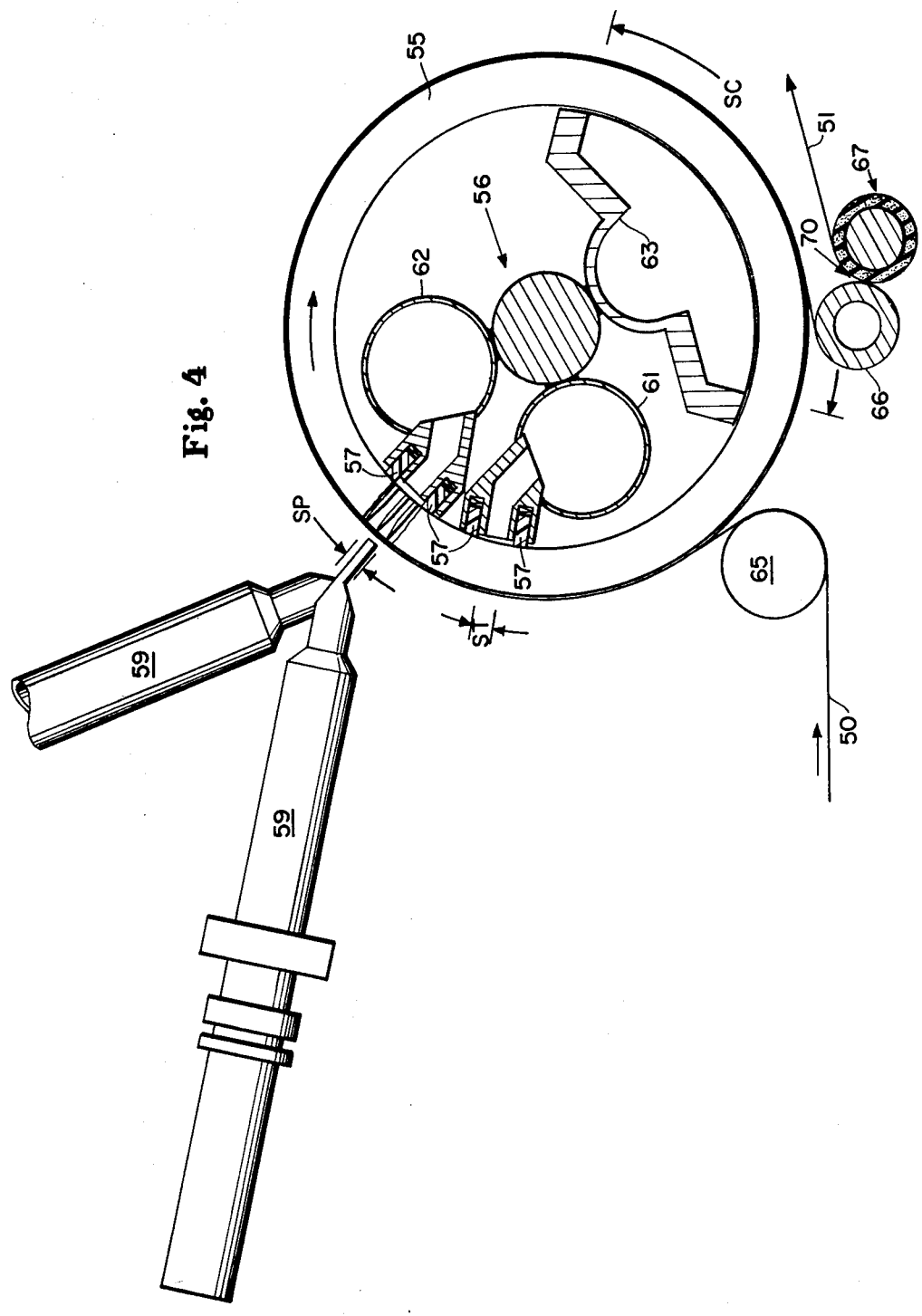
FIG. 4 is a fragmentary, enlarged scale, side elevational view of the debossing and perforating cylinder portion of the apparatus shown in FIG. 1.

FIG. 4 is an enlarged scale end view of the debossing and perforating means 43, FIG. 1, which includes a rotatably mounted debossing-perforating cylinder 55, a nonrotating triplex vacuum manifold assembly 56 including seals 57, and hot air jet means; heaters 59. The triplex vacuum manifold assembly 56 comprises three manifolds designated 61, 62, and 63. FIG. 4 also shows a freely rotatably mounted lead-on idler roll 65, a power rotated lead-off/chill roll 66, and a soft-face (e.g., low density neoprene) roll 67 which is gear driven by the chill roll through gears 68, 69, FIG. 1. Briefly, by providing means (not shown) for independently controlling the degree of vacuum in the three vacuum manifolds, a thermoplastic ribbon of film running circumferentially about a portion of the debossing-perforating cylinder 55 is sequentially subjected to a first level of vacuum in a first sector ST, FIG. 4, a second level of vacuum in a second sector SP, and a third level of vacuum in a third sector SC. As will be described more fully hereinafter, the vaccum applied to the film in sector ST enables maintaining upstream tension in the film, vacuum in sector SP enables perforating the film when hot air is directed radially inwardly against the film, and vacuum in sector SC enables cooling the film to below its thermoplastic temperature and enables establishing downstream tension therein. The nip 70 intermediate chill roll 66 and the soft-face roll 67 is only nominally loaded because high pressure would iron-out the debossments which are alternatively designated tapered capillaries 53, FIGS. 2 and 3. However, even nominal pressure in nip 70 helps the vacuum in sector SC to isolate downstream tension (e.g.: roll winding tension) from the debossing-perforating sector SP of the debossing-perforating cylinder 55, and enables the nip 70 to peel the debossed and perforated film from the debossing-perforating cylinder 55. Moreover, while vacuum drawn ambient air passing through the film in sector SC will normally cool the film to below its thermoplastic temperature, the passage of coolant through the chill roll as indicated by arrows 73, 74 in FIG. 1 will enable the apparatus to handle, for instance, thicker films, or be operated, for instance, at higher speeds.

Referring back to FIG. 1, the constant tension film supply means 41 and the constant tension film forwarding and winding means 45 are substantially identical to and function substantially identically to the corresponding portions of the apparatus shown and described in U.S. Pat. No. 3,674,221 which was referenced hereinbefore and which is hereby incorporated by reference.

Briefly, however, the constant tension film supply means 41 comprises means 75 for rotatably mounting a roll 76 of thermoplastic film, a first idler roll 78, a dancer assembly 79 having a swingably mounted, freely rotatable dancer roll 80, a second idler roll 78A, a Mount Hope Vari-Bow (Registered Trademark of Mount Hope Machinery Company, Taunton, Massachusetts 02780) smoothing roll 81, the film-lead-on idler roll 65, and feedback film tension control means 83 comprising a dancer elevation position sensor 84, an unwind tension controller 85, and a variable-torque unwind brake 86. When the film 50 is looped from the roll 76 to the debossing-perforating cylinder 55 as shown in FIG. 1, the film 50 is adhered to the first sector ST, FIG. 4, of the debossing-perforating cylinder 55 by vacuum applied through manifold 61. Thus, the film 50 is pulled as the debossing-perforating cylinder rotates clockwise as indicated, while the tension control loop causes the unwind brake 86 to sufficiently resist unwinding the roll 76 of film 50 to establish and maintain a constant predetermined level of tension in the film in the machine direction. This, in turn, enables the film 50 to be tensioned transversely as it is drawn over the Mount Hope Vari-Bow roll 81 whereby it is smoothed; i.e., made wrinkle free by having a transverse tension developed in the film as it runs over the arcuate-shape roll 81.

The tension in the film is reduced to zero, and the film is debossed and perforated as it passes over the second sector SP, FIG. 4, of the rotating debossing-perforating cylinder 55. Then, the film is adhered to the third sector SC of the debossing-perforating cylinder 55 by vacuum applied to manifold 63 to enable the constant tension film forwarding and winding means 45 to again establish and maintain sufficient uniform tension in the film 51 to forward the film downstream under sufficient control to, for instance, wind the film to form a roll 90 of debossed and perforated film. In this event, the torque of the winding drive motor 91 is controlled by the dancer-roll-position-responsive sensor 92 connected via trapeze 93 to dancer roll 94 through the winding drive and tension controller 95 to establish and maintain a substantially constant predetermined level of machine direction tension in film 51. To summarize, the first and third vacuum sectors, ST and SC respectively of the debossing-perforating cylinder 55 enable maintaining substantially constant upstream and downstream tension respectively in a running ribbon of film while the intermediate portion of the film adjacent the second vacuum sector SP of the debossing-perforating cylinder 55 is subjected to tension vitiating heat and vacuum to effect debossing and perforating the film.

Weights 96, FIG. 1, on the dancer trapeze arms, 97 and 98, enable independently adjusting the upstream and downstream levels of tension: higher tensions by placing the weights 96 further from the dancer shafts 99,100; and lower tensions by moving the weights 96 towards the dancer shafts 99,100.

Referring again to FIG. 1, the debossing and perforating means 43 comprises the rotatably mounted debossing-perforating cylinder 55, means 110 for rotating the cylinder 55 at a controlled peripheral velocity, the non-rotating triplex vacuum manifold assembly 56 inside the debossing-perforating cylinder 55, means not shown for applying controlled levels of vacuum inside the three vacuum manifolds 61, 62 and 63 comprising the triplex manifold assembly 56, and a plurality of air heaters 59.

Figure 5:
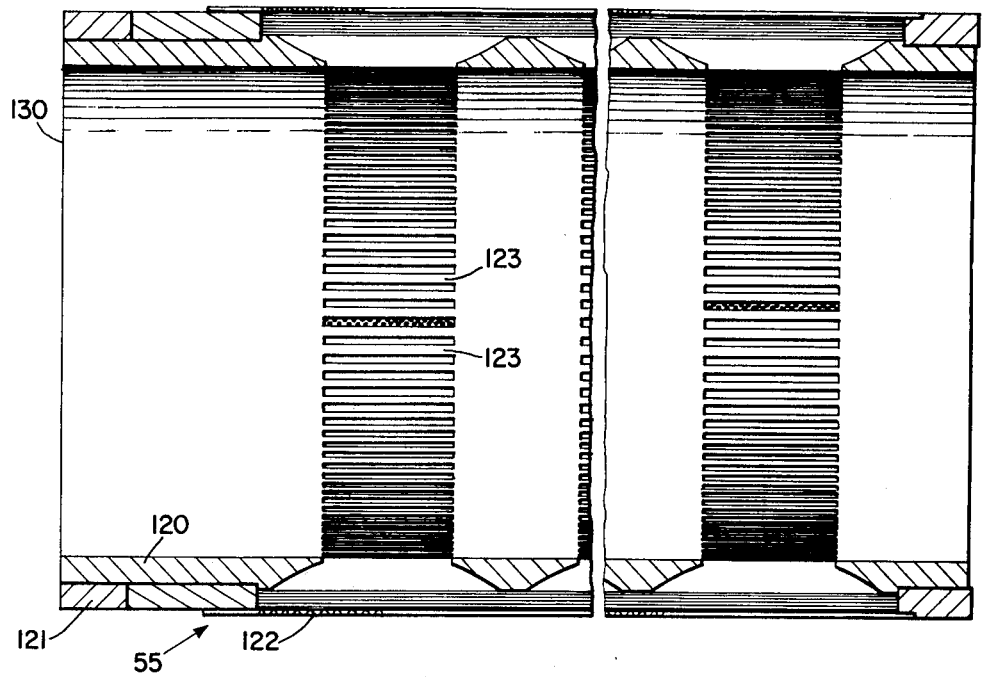
FIG. 5 is an enlarged scale, longitudinal sectional view of the debossing-perforating cylinder of the apparatus shown in FIG. 1.
Figure 6:
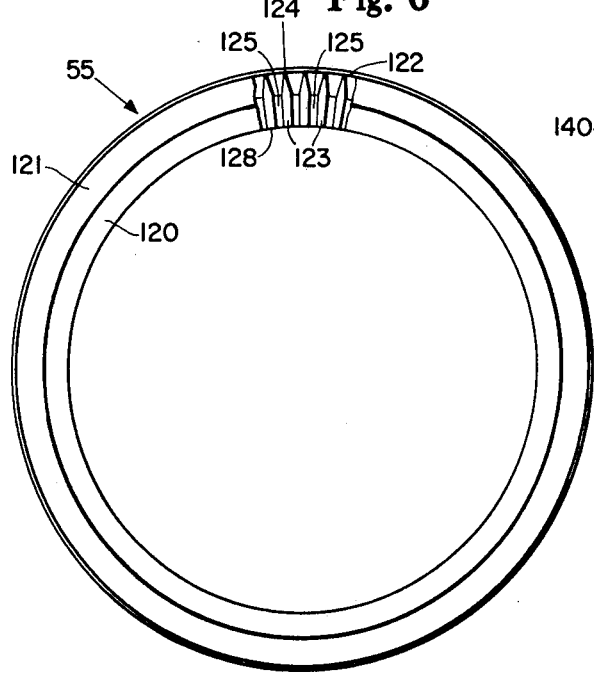
FIG. 6 is an end view of the debossing-perforating cylinder shown in FIG. 5.

The debossing perforating cylinder 55, FIGS. 5 and 6, comprises a cage 120, a support ring 121 and a thin wall perforated tubular member 122. The cage 120 comprises a multiplicity of circumferentially spaced, longitudinally extending bars 123 which are tapered to relatively small, radially outwardly facing lands 124, and the spaced bars 123 have vacuum communicating passageways 125 provided therebetween. The bars 123 also have radially inwardly facing lands 128 which corporately provide a cylindrical vacuum sealing surface against which the vacuum seals 57, FIG. 4, are biased. Thus, as the debossing-perforating cylinder 55 rotates, FIG. 4, its vacuum sealing surface slides over the seals 57 of the non-rotating triplex vacuum manifold assembly 56.

The end 130, FIG. 5, of the debossing-perforating cylinder 55 disposed remotely from its driven end is open in order to provide easy insertion/removal of the triplex vacuum manifold assembly 56. Therefore, in order to rotatably support the open end 130 of the cylinder 55, it is provided with a bearing-race support ring 121, FIG. 5, which rides on bearings, not shown, which are appropriately secured to the apparatus frame, not shown.

Figure 7:
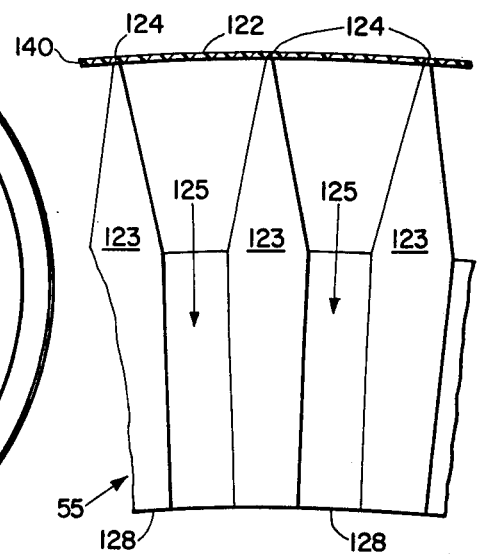
FIG. 7 is a greatly enlarged scale, fragmentary portion of the end view of the debossing-perforating cylinder shown in FIG. 5.

FIG. 7 shows the perforated tubular member 122 to comprise a thin wall 140 in contacting relation with the small lands 124 of the cage 120. The lands 124 are small and the tubular member 122 is thin-walled because the preferred embodiment apparatus 40, FIG. 1, is configured to deboss and perforate a relatively thin thermoplastic film such as low density polyethylene film to provide small tapered capillaries, FIGS. 2 and 3.

FIG. 8 is a perspective view of the perforated tubular member 122, of the debossing-perforating cylinder 55 having a diameter D and length L. In the preferred embodiment apparatus, D is 8.914 inches (22.64 centimeters) and L is 21.50 inches (54.61 centimeters). Also, the member has a longitudinally extending seam, 176.

FIG. 9 is a radially inwardly facing, enlarged scale view of a fragmentary portion of the perforated tubular member 122, FIG. 8, and FIG. 10 is a further enlarged scale sectional view taken along line 10—10 of FIG. 9. Thus, the perforated tubular member 122 of the preferred embodiment apparatus 40 comprises a thin wall 140 having a thickness T (from about 0.013 inches to about .014 inches), and having a closely packed array of tapered holes 141 therethrough. The holes 141, FIG. 9, are circumferentially spaced (CS) 0.040 inches (0.102 centimeters) center-to-center, transversely spaced (TS) 0.0346 inches (0.088 centimeters) center-to-center, have base diameters (BD) of 0.040 inches (0.102 centimeters), and hole diameters (HD) of 0.013-0.014 inches (0.0330 to 0.0356 centimeters). The holes 141, FIG. 10, have included angles A of 90 degrees, and included half angles B of 45 degrees. Thus, the perforated tubular member 122 of the preferred embodiment apparatus 40 has approximately four-hundred-thirty-five-thousand (435,000) holes 141 in it.

Heaters 59 of the preferred apparatus, FIGS. 1 and 4, are Model No. 33-HS which are available from Kamweld Products Company, Inc., 90 Access Road, P.O. Box 91, Norwood, Mass. 02062. When operated on 120 volts, they provide 900 watts of heat and cause a flow of 6-8 cfm to be heated approximately 243 degrees centigrade; substantially higher than the thermoplastic temperature of low density polyethylene.

METHOD OF DEBOSSING AND PERFORATING A RUNNING RIBBON OF THERMOPLASTIC FILM

In view of the foregoing description of the preferred apparatus embodiment of the present invention, the method need not be described exhaustively. Suffice it to say, the method of the present invention to continuously deboss and perforate a running ribbon of smooth thermoplastic film comprises the steps of: establishing and maintaining control of the running film by establishing and maintaining constant tension therein; isolating a portion of the film from the constant tension while it is in contacting relation with a perforated pattern surface; heating the tension isolated portion of the film to raise its temperature to above its thermoplastic temperature; applying a sufficiently great pneumatic differential pressure to the heated, tension isolated portion of the film to cause the film to be debossed and perforated in the image of the perforated pattern surface; and, cooling the debossed and perforated film to lower its temperature to below the thermoplastic temperature of the film before subjecting the film to downstream tension.

METHOD OF MAKING PERFORATED TUBULAR MEMBER

The method of the present invention of making the preferred embodiment perforated tubular member 122, FIG. 8, is depicted sequentially in FIGS. 11 through 20.

FIG. 11 is a longitudinal sectional view of a pattern cylinder 150 comprising a shell 151 and two end bells 152, 153, which end bells enable the pattern cylinder 150 to be rotated on its axis. With respect to the preferred method of the present invention, shell 151 comprises 6061-T6 aluminum which is readily embossible, and which can be etched away by a fifteen percent solution of hydrochloric acid (HCl) or caustic soda ($NaHO_3$).

FIG. 12 is a fragmentary sectional view of the pattern cylinder 150 showing an array of radially outwardly extending conical protruberances 155 on the radially outwardly facing portion or surface 156 of the shell 151. Such protruberances 155 can be machined but in the preferred method they are formed by metal displacement as by knurling. That is, by a metal displacing operation rather than a metal removal operation.

FIG. 13 is a fragmentary view showing a covering 158 over the protruberances 155 which covering 158 is preferably electrodeposited nickel; for instance, GAR Pure Electroformed Nickel which has been deposited from GAR Proprietary Sulfamate Electrolyte which is available from the GAR Electroforming Division of the Mite Corporation, Danbury, Conn. 06810.

FIG. 14 shows a fragmentary sectional portion of the electroplated pattern cylinder 150 after it has been surface ground to a sufficiently small diameter to truncate the protruberances 155 to form circular lands 160 thereon having the same diameter DL as the holes 141 through the perforated tubular member 122 being made.

The shell 151 is then sufficiently etched away to release the remaining electroplating 158R, FIG. 15, which is in fact an inside-out perforated tubular member 122 and is designated 122A. This is accomplished for instance by a solution comprising fifteen percent hydrochloric acid or caustic soda ($NaHO_3$) as stated hereinbefore.

FIG. 16 is a perspective view of an inside-out perforated tubular member 122A which has been made by the method illustrated in FIGS. 11 through 15, and as described above. The inside-out perforated tubular member 122A is then turned right-side-out by the method depicted sequentially in FIGS. 17 through 20, to wit: the inside-out member 122A is slit longitudinally, FIG. 17, along line 170 to provide slitting formed edges 171, 172 and then, through the use of a cylindrical forming mandrel 175, is rerolled about the mandrel 175 to the desired tubular shape. The perforated tubular member 122 is then completed by joining the slittng-formed edges 171, 172 together to form a seam 176. Preferably, the seam 176 is formed by electron beam butt welding the slitting-formed edges 171, 172 together.

Thus, when the perforated tubular member 122 is removed from the mandrel 175, FIG. 20, it is the member 122 as shown in FIG. 8.

FIG. 21 is a fragmentary sectional view of the perforated tubular member 122, FIG. 8, and shows the right-side-out finished member 122 as compared to the inside-out tubular member 122A, FIG. 15.

ALTERNATE METHOD OF MAKING PERFORATED TUBULAR MEMBER

FIGS. 22 and 23 show different steps of an alternate method of making the perforated tubular member 122, FIG. 8, which method utilizes several of the same steps of the preferred method described hereinabove. In the alternate method, a pattern cylinder 150 is still prepared as shown in FIG. 11, and is provided with radially outwardly extending protruberances 155, FIG. 12. Next, however, rather than overplate as shown in FIG. 13, the protruberances 155 are uniformly truncated, FIG. 22, as by grinding while rotating the pattern cylinder 150 about its axis.

The pattern cylinder 150 is then provided with a coating 258, FIG. 23, as by electroplating with Nickel after coating the truncation-formed lands 160 of the protruberances 155 with a plating resist material. Then, the surface of the plating/cylinder is ground to level the plating to provide the configuration shown in FIG. 14. The perforated tubular member is completed by releasing the plating from the pattern cylinder 150, to provide the inside-out member 122A, FIGS. 15 and 16, and by turning it right-side-out, as shown in FIGS. 17 through 20.

APPARATUS OPERATION

To operate apparatus 40, the film 50 is looped, as shown in FIG. 1, from roll 76, over idler roll 78, under dancer roll 80, over idler roll 78A, over the Mount Hope Vari-Bow roll 81, under the lead-on idler roll 65, clockwise about the debossing-perforated cylinder 55, under the lead-off/chill roll 66, through the nip 70 intermediate the lead-off/chill roll 66 and the soft-face roll 67, over idler roll 78B, under dancer roll 94, over idler roll 78C, and thence onto a spool 200 on the roll winding shaft 201. The idler roll 78D is mounted so that it is gravitationally loaded against the top portion of the roll 90 being wound. The unwind tension control loop and the winding tension control loop are activated. The drive motor 202 is then operated by the drive controller 203 in response to operator inputs and in response to the feedback tachometer 204 to rotate the debossing-perforating cylinder 55 at a predetermined peripheral speed, and the chill roll 66 at a slightly higher (slack obviating) peripheral speed. The tension control loops respond to establish and maintain their respective predetermined levels of tension (as determined by the positions of weights 96) substantially irrespective of the film velocity.

Air is then directed through heaters 59, FIG. 1, and electrical power is applied thereto whereby jets of hot air issue from the heaters 59 to form a virtual curtain of hot air directed radially inwardly towards sector SP, FIG. 4, of the debossing-perforating cylinder 55. With sufficient levels of vacuum applied to sectors ST and SC to isolate sector SP from upstream and downstream tension, vacuum applied to sector SP acts in concert with the hot air jets to deboss and perforate the film.

When the preferred apparatus is used to deboss and perforate low density polyethylene having a thickness of 0.001 inches at 50 feet per minute, the upstream tension is adjusted to about 8 ounces per lineal inch, the downstream tension is adjusted to about 2 ounces per lineal inch, and the levels of vacuum applied to sectors ST, SP, and SC are 5, 15, and 5 inches of mercury respectively.

While the preferred embodiment apparatus has been shown and described as comprising unwinding and winding means, and while the preferred method of making a perforated tubular member has been described as comprising the steps of electroplating nickel over aluminum and etching release, these limitations are not believed to be critical to the present invention. Indeed, while these and other aspects of the present invention have been illustrated and described, it will be obvious to those skilled in the art that various changes and modifications can be made without departing from the spirit and scope of the present invention, and it is intended to cover in the appended claims all such changes that are within the scope of the invention.

What we claim is:

1. A method of making a perforated tubular member having a relatively thin tubular wall of a metal which wall is perforated by an array of radially inwardly tapered apertures, said method comprising the steps of:

forming a pattern cylinder having a cylindrical surface and a multiplicity of protruberances extending radially outwardly from said cylindrical surface, said protruberances being tapered radially outwardly and having a radially extending height greater than the thickness of said wall, said protruberances being so spaced and shaped that they comprise an inside-out negative pattern for said array of apertures and so that the composite of the spaces intermediate said protruberances comprise an inside-out negative pattern for said member;

covering said cylindrical surface and filling said spaces with a coherent mass of said metal to provide a coating;

converting said coating into an inside-out said tubular member by machining the radially outwardly facing areas of said coating and said protruberances to truncate said protruberances to uniform heights equal to the thickness of said wall and to cause said coating to have a thickness equal to the desired thickness of said tubular wall;

disassociating said inside-out tubular member from said pattern cylinder;

converting said inside-out tubular member into said tubular wall by longitudinally slitting it, reverse rolling it into its ultimate tubular shape, and seaming the slitting-formed-edges together in abutting relation.

2. The method of claim 1 further comprising the step of coating the radially outwardly facing surface of said perforated tubular member with release enhancing material.

3. The method of claim 1 wherein said cylinder comprises a malleable metal, said protruberances are formed by knurling the radially outwardly facing surface of said cylinder, said coating is formed by electrodepositing said metal; and said disassociating is accomplished by chemically etching said cylinder.

4. A method of making a perforated tubular member having a relatively thin tubular wall of a metal which wall is perforated by an array of radially inwardly tapered apertures, said method comprising the steps of:

forming a pattern cylinder having a cylindrical surface and a multiplicity of protruberances extending radially outwardly from said cylindrical surface, said protruberances being tapered radially outwardly and having a radially extending height greater than the thickness of said wall, said protruberances being so spaced and shaped that they comprise an inside-out negative pattern for said array of apertures and so that the composite of the spaces intermediate said protruberances comprise an inside-out negative pattern for said member;

uniformly truncating said protruberances to form radially outwardly facing lands thereon and to reduce their heights to the desired thickness of said wall;

covering said cylindrical surface but for said lands, and filling said spaces with a coherent mass of said metal to provide a coating;

converting said coating into an inside-out said tubular member by machining the radially outwardly facing areas of said coating to a thickness equal to the desired thickness of said tubular wall;

disassociating said inside-out tubular member from said pattern cylinder;

converting said inside-out tubular member into said tubular wall by longitudinally slitting it, reverse rollling it into its ultimate tubular shape, and seaming the slitting-formed-edges together in abutting relation.

5. The method of claim 4 further comprising the step of coating the radially outwardly facing surface of said perforated tubular member with release enhancing material.

6. The method of claim 4 wherein said cylinder comprises malleable metal, said protruberances are formed by knurling the radially outwardly facing surface of said cylinder, said coating is formed by electrodepositing said metal; and said disassociating is accomplished by chemically etching said cylinder.

* * * * *

UNITED STATES PATENT AND TRADEMARK OFFICE
CERTIFICATE OF CORRECTION

PATENT NO. : 4,214,945
DATED : July 29, 1980
INVENTOR(S) : Malcolm B. Lucas and Robert H. Van Coney It is certified that error appears in the above-identified patent and that said Letters Patent are hereby corrected as shown below:

In the Abstract, line 6, "then" should read --thence--.

In the Abstract, line 19, "Then" should read --Thus,--.

Column 2, line 58, "wherein" should read --therein--.

Column 4, line 45, "now" should read --not--.

Signed and Sealed this

Twenty-fifth Day of November 1980

[SEAL]

Attest:

SIDNEY A. DIAMOND

Attesting Officer

Commissioner of Patents and Trademarks